US007864701B2

(12) United States Patent
Matusz

(10) Patent No.: US 7,864,701 B2
(45) Date of Patent: Jan. 4, 2011

(54) APPARATUS, SYSTEM AND METHOD CAPABLE OF DECREASING MANAGEMENT FRAME SIZE IN WIRELESS NETWORKS

(75) Inventor: Pawel Oskar Matusz, Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 1285 days.

(21) Appl. No.: 11/096,810

(22) Filed: Mar. 31, 2005

(65) Prior Publication Data
US 2006/0222001 A1 Oct. 5, 2006

(51) Int. Cl.
H04L 12/28 (2006.01)
(52) U.S. Cl. ........................ 370/254; 370/401
(58) Field of Classification Search .................. 370/465
See application file for complete search history.

(56) References Cited

U.S. PATENT DOCUMENTS

| 6,385,199 | B2* | 5/2002 | Yoshimura et al. | 370/393 |
|---|---|---|---|---|
| 6,985,437 | B1* | 1/2006 | Vogel | 370/230 |
| 7,453,907 | B2* | 11/2008 | Jonsson et al. | 370/477 |
| 2001/0055297 | A1* | 12/2001 | Benveniste | 370/349 |
| 2002/0015393 | A1* | 2/2002 | Pan et al. | 370/335 |
| 2002/0136168 | A1* | 9/2002 | Struhsaker et al. | 370/277 |
| 2004/0165527 | A1* | 8/2004 | Gu et al. | 370/229 |
| 2004/0185853 | A1* | 9/2004 | Kim et al. | 455/438 |
| 2005/0159163 | A1* | 7/2005 | Chang et al. | 455/450 |

FOREIGN PATENT DOCUMENTS

| JP | 2004-38810 A | 2/2004 |
|---|---|---|
| JP | 2005-65275 A | 3/2005 |
| TW | 563308 | 11/2003 |
| TW | 564614 | 12/2003 |
| WO | WO 00/79764 A1 | 12/2000 |

OTHER PUBLICATIONS

"Scalable OFDMA Physical Layer in IEEE 802.16 WirelessMAN", Intel Technology Journal 8(3):201-212, (2004) XP-002331249.
Degermark, M., et al. Wireless Networks 3:375-387, (1997) XP-000728935.
International Application No. PCT/US2006/012600, International Search Report and Written Opinion.

* cited by examiner

Primary Examiner—Chirag G Shah
Assistant Examiner—Daniel Mitchell
(74) Attorney, Agent, or Firm—Blakely, Sokoloff, Taylor & Zafman LLP

(57) ABSTRACT

An embodiment of the present invention provides an apparatus, comprising a transceiver capable of transmitting decreased size management messages in a wireless network by transmitting only differences between subsequently sent management messages and previously sent management messages. The wireless network may be according to the Institute of Electronic and Electrical Engineers (IEEE) latest 802.16 standard. The determination of differences between subsequent management messages may be accomplished by the management message header being extended by an optional field, informing whether the rest of the management message is a full management message or a delta from the previous management message. The management message may be a DL Map (Downlink Map) and UL Map (Uplink Map) and may be transmitted by a base station (BS) in downlink (DL) periodically, in each radio frame and a full map message may still transmitted in predefined intervals for synchronization and to allow new subscriber stations to join the network. Further, a receiver of the management messages may know a previously sent management message and may merge it with changes conveyed in a delta message to obtain a current full map of the management message.

7 Claims, 3 Drawing Sheets

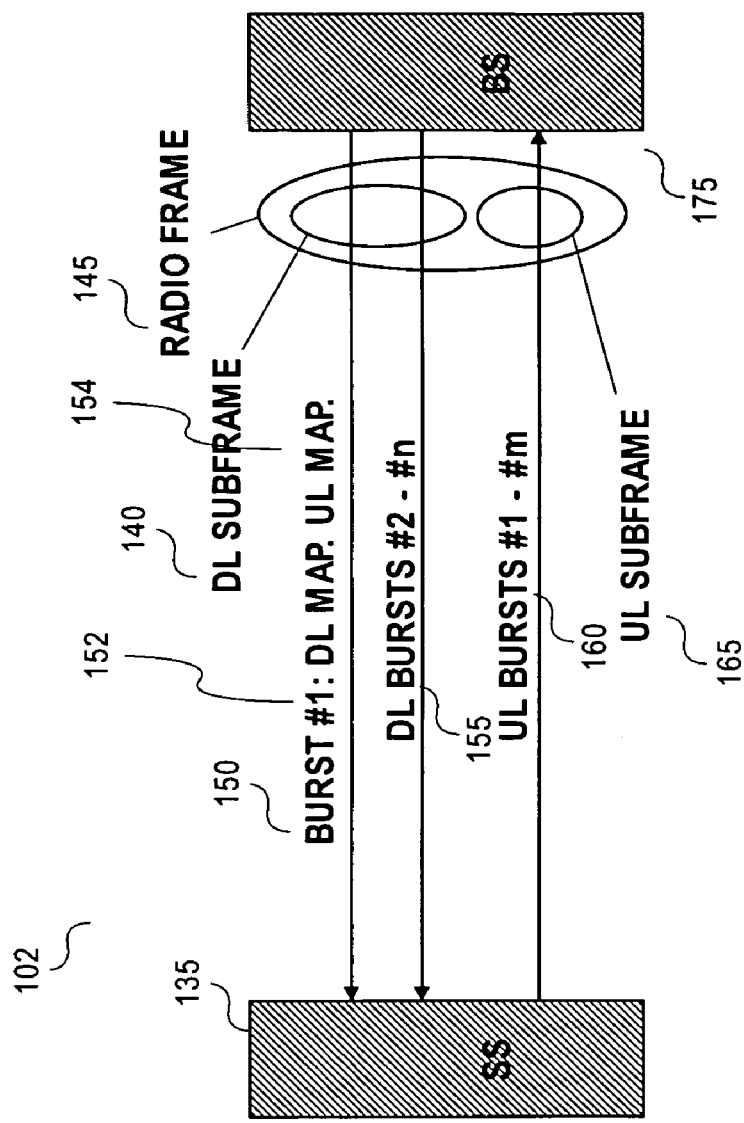
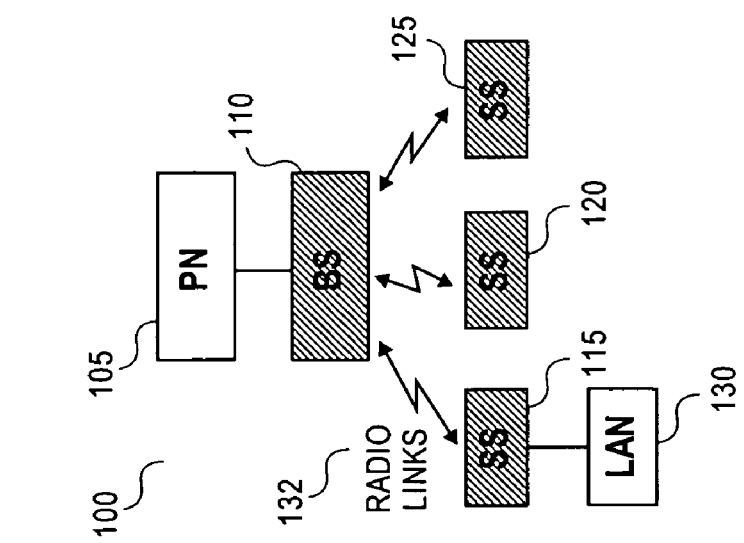

APPARATUS, SYSTEM AND METHOD CAPABLE OF DECREASING MANAGEMENT FRAME SIZE IN WIRELESS NETWORKS

BACKGROUND

Wireless networks and wireless communication have become prevalent throughout society creating the need for increased capacity and faster and more reliable wireless communication techniques. Because radio resources are limited, every improvement that allows transferring more data using the same bandwidth is of great value to service providers and users of wireless networks; although the benefits of the present invention are not limited to service providers and users of wireless networks.

Thus, a strong need exists for a system, apparatus and method capable of improving the amount of data transfer for a given bandwidth in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A illustrates the topology of an IEEE 802.16 network; and

FIG. 1B illustrates the transmission of DL/UL subframes and management messages of one embodiment of the present invention;

Figure 2:
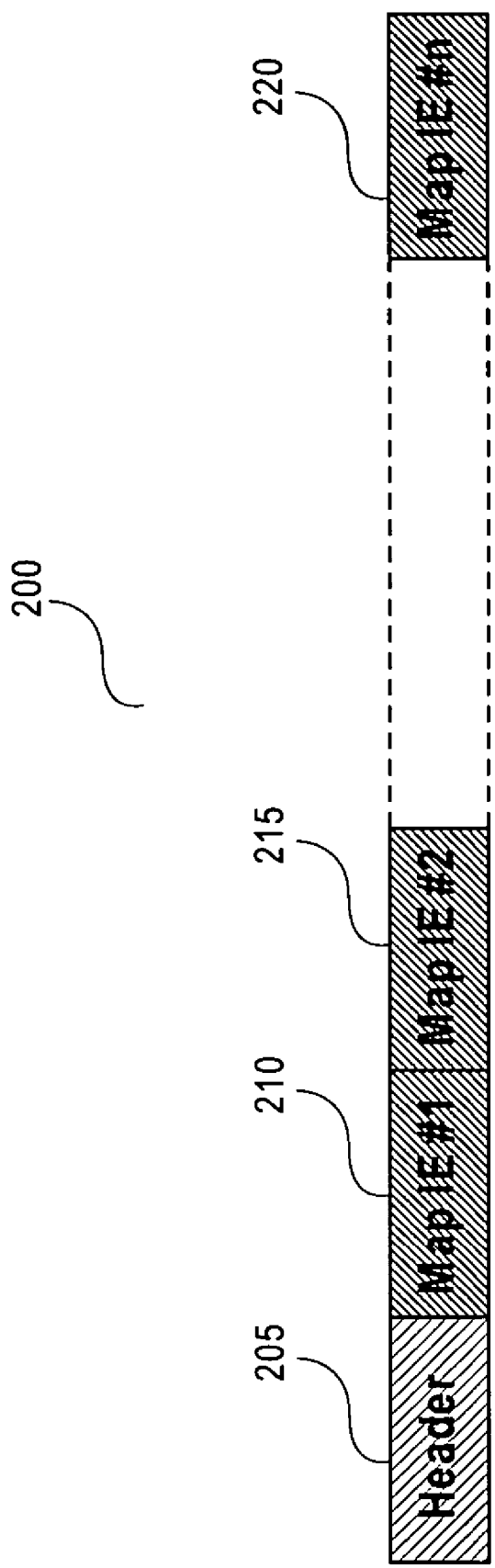
FIG. 2 illustrates the structure of a DL Map or UL Map message of one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

An embodiment of the present invention provides an apparatus, system and method capable of decreasing management frame size in wireless networks. Turning to FIG. 1, is an illustration of the topology of an Institute for Electronic and Electrical Engineers (IEEE) 802.16 network 100 and transmission of DL (Down Link)/UL (Up Link) subframes and management messages 102 of one embodiment of the present invention. In the IEEE 802.16 standard (which also may be referred to as WiMax), two communicating wireless network nodes may be defined: the Base Station (BS) 175 and the Subscriber Station (SS) 135 (although the present invention is not limited to these network node definitions nor to wireless communications which utilize the IEEE 802.16 standard). The BS 175 (connected to a Provider Network—PN 105) is the managing entity and controls several SSs 115, 120 and 125 (connected usually to private Local Area Networks—LANs 130) over the radio link 132). BS 175 sends data to SSs 135 in downlink (DL) (Burst #1 150 and Burst #2 155) and receives data from SSs 135 in uplink (UL) 160 in the form of radio frames 145, which are sent in UL and DL with constant, but configurable intervals (e.g. every 5 ms). The UL and DL frames, called subframes 140 and 165 (as they together form a complete radio frame), may be composed of variable length bursts (Burst #1 150 and Burst #2 155). Each burst may be transmitted on the radio interface using a different modulation and coding scheme.

DL and UL bandwidth available on the radio link may be limited. The BS 175, as the managing entity, may control bandwidth utilization. In DL, it may analyze the amount of traffic incoming from PN 105 and schedule it for transmission to destination SSs 115, 120 and 125. In UL it may also be the BS 175 which grants bandwidth to SSs 115, 120 and 125, basing on bandwidth requests received from SSs 115, 120 and 125. Each radio frame the BS 175 sends in DL in the first burst 150, on the broadcast channel (so it can be received by all SSs 115, 120 and 125), two management messages:

DL Map, containing several data records which describe exactly what bursts will be sent in DL at what moments of the radio frame (precisely, the DL subframe 140)

UL Map, containing several data records which describe exactly which SS can transmit in which part (burst) of the data frame (precisely, the UL subframe 165). It also defines the position and size of contention slots (bursts) in the UL subframe 165, and the start of the UL subframe 165 itself.

Additionally, the BS 175 may send in DL 150 two other management messages: DCD and UCD, describing all combinations of coding, modulation and several other parameters which can be used in DL 150 and UL 160 bursts, respectively. These messages do not need to be sent every radio frame, but they may be sent in predefined intervals.

Management messages occupy a significant portion of the radio frame. Their total size may vary from about 50 bytes to over 1000 bytes. In the case of radio frames, which are typically a few kilobytes long, a significant portion of bandwidth is used to transmit only the formerly mentioned messages. Some wireless communications, including during the operation of an 802.16 network, there are often periods when the DL and UL maps do not change, or change very little between subsequent frames. They have to be transmitted every frame anyway, because every frame the SSs 115, 120 and 125 need to know when to receive and send data on the radio interface.

An embodiment of the present invention provides a method of saving radio bandwidth by decreasing the size of management messages (for example, DL Map 152 and UL Map 154) sent over the radio interface. This embodiment is capable of sending full maps only in predefined intervals (e.g. every 100-th radio frame) and, at all other times, sending only the difference (delta) between the full and the actual map. A similar method may be applied in case of e.g. DCD and UCD messages, although they may be sent with longer intervals and thus the gain would not be so significant. It is understood that any messages may utilize the present invention and although described in terms of periodically sent DL Map and UL Map messages, the present invention may also be applied to other management messages (e.g. DCD, UCD).

Some management messages, such as DL Map 152 (Downlink Map) and UL Map (Uplink Map) 154 are transmitted by BS 175 in downlink (DL) 150 periodically, in each radio frame 145. Subsequent DL Map and UL Map messages are often very similar, or even the same. An embodiment of the present invention provides that the size of these messages may be decreased by transmitting only differences (deltas) between subsequent messages. A full map message (for synchronization purposes and e.g. to allow new SSs to join) may still be transmitted in predefined intervals, but sending message deltas can save a significant amount of bandwidth (especially if most of the traffic is Constant Bit Rate (CBR), which may be mapped to the Unsolicited Grant Service (UGS), IEEE 802.16 traffic class). Management message size may vary from about 50 bytes to over 1 kilobyte and because radio frames are typically a few kilobytes long (depending on frame interval and modulation/coding scheme), up to about 25% of bandwidth can be saved using the present invention. This bandwidth may be used to convey user traffic.

Further detailed description below may refer to a 'map' in common, because the process may be the same for both DL and UL Maps. Turning now to FIG. 2, generally at 200, each map may be composed of a set of Map Information Elements (Map IE) 210, 215 through 220 describing used bursts, preceded by a header 205 containing general information.

Figure 3:
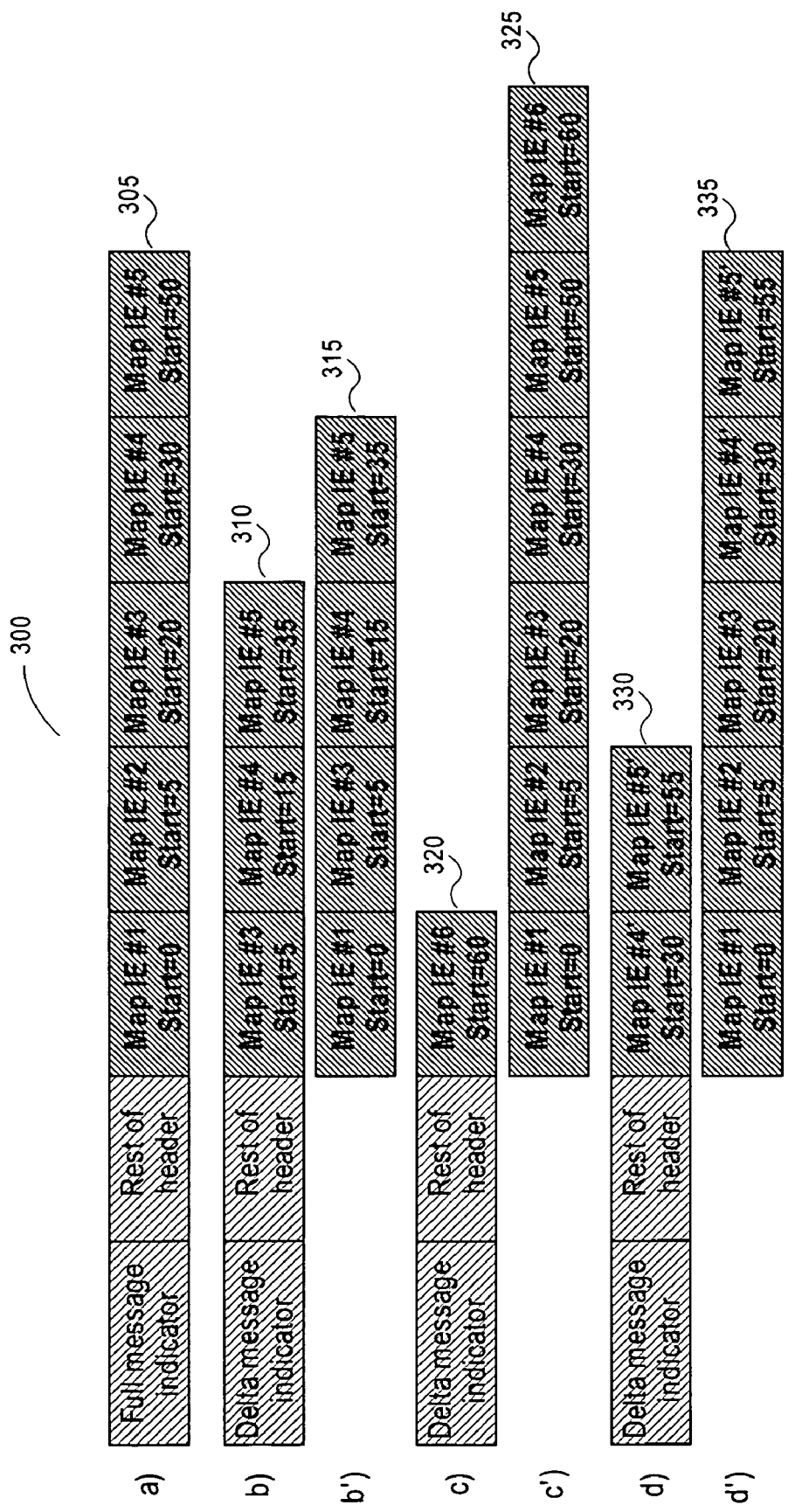
FIG. 3 illustrates an implementation of one embodiment of the present invention where the differences (deltas) between subsequent frames may be coded as set forth.

In FIG. 3, shown generally as 300, is an implementation of one embodiment of the present invention where the differences (deltas) between subsequent frames may be coded as set forth. It is understood that this is but one coding scheme and any number of distinct coding schemes may be utilized in the present invention. An embodiment provides: a) full message 205; b) delta message with Map IE #2 removed 310; b') result of merging delta message b. with previous full message a.; c) delta message with added Map IE #6; c') result of merging delta message c. with previous full message a.; d) delta message with modified Map IE #4' and Map IE #5'; d') result of merging delta message d. with previous full message a.

The differences (deltas) between subsequent frames may be coded as shown. Again, the present invention is not limited to this exemplified coding scheme. In this embodiment, the message header should be extended by an optional field, informing whether the rest of the map is a full map or a delta from the previous map. This should be done for synchronization purposes, so that SSs that lost synchronization or new SSs, wishing to join, may detect a full map. Each Map IE may contain information when the relevant burst starts (in radio symbols), which is represented in FIG. 3 by values of 'start'. If a Map IE is removed, inserted or modified and is the first removed/inserted/modified Map IE on the list, it may start in the same place as one of the Map IEs in the previous map. All succeeding Map IEs may change their position and content. Therefore, the delta map may contain the first Map IE that has been added (c. 320) or changed (d. 330), or the first Map IE succeeding a removed Map IE (b. 310), and all the following Map IEs (no matter if they are the same, added or modified). The receiver, knowing the previous message (message from a. in the present example) may merge it with changes conveyed in the delta message (results shown in FIG. 3*b'*, 3*c'* and 3*d'*) to obtain the current full map.

In a worst case scenario, the delta message may contain all Map IEs (if e.g. the first element is modified) so it is equal to the full message. In the best case, it can have no Map IEs (if no elements are modified) and just contain the header. Therefore, using this invention always results in bandwidth gain because sending a full map is equal to the worst case that can happen when using the described method.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
   a transceiver which decreases the size of management messages transmitted in a wireless network by transmitting only differences between subsequently sent management messages and previously sent management messages; and
   wherein the determination of differences between subsequent management messages is accomplished by the management message header being extended by an optional field, informing whether the rest of the management message is a full management message or a delta from the previous management message, wherein said management message is a DL Map (Downlink Map) and UL Map (Uplink Map) and are transmitted by a base station (BS) in downlink (DL) periodically, in each radio frame, wherein a full map message is still transmitted in predefined intervals for synchronization and to allow new subscriber stations to join said network, wherein a receiver of said management messages knows a previously sent management message and merges it with changes conveyed in a delta message to obtain a current full map of said management message, wherein the BS sends in DL, a DCD message describing all combinations of coding, modulation that can be used in DL, and a UCD message describing all combinations of coding, modulation that can be used in UL, the delta map comprising a first Map IE that has been added or changed, or a first Map IE succeeding a removed Map IE, and all the following Map IEs.

2. The apparatus of claim 1, wherein said wireless network is according to the Institute of Electronic and Electrical Engineers (IEEE) latest 802.16 standard adopted prior to Mar. 15, 2005.

3. An article of manufacture, comprising:
a non-transitory storage medium having stored thereon instructions, that, when executed by a computing platform results in:
transmitting decreased size management messages in a wireless network, comprising by transmitting only differences between subsequently sent management messages and previously sent management messages,
wherein said management message is a DL Map (Downlink Map) and UL Map (Uplink Map) and are transmitted by a base station (BS) in downlink (DL) periodically, in each radio frame,
wherein a full map message is still transmitted in predefined intervals for synchronization and to allow new subscriber stations to join said network,
wherein a receiver of said management messages knows a previously sent management message and merges it with changes conveyed in a delta message to obtain a current full map of said management message,
wherein the BS sends in DL, a DCD message describing all combinations of coding, modulation that can be used in DL, and a UCD message describing all combinations of coding, modulation that can be used in UL, the delta map comprising a first Map IE that has been added or changed, or a first Map IE succeeding a removed Map IE, and all the following Map IEs.

4. The article of claim 3, wherein said computing platform further controls the determination of the differences between subsequent management messages by the management message header being extended by an optional field, informing whether the rest of the management message is a full management message or a delta from the previous management message.

5. The article of claim 4, wherein said management message is a DL Map (Downlink Map) and UL Map (Uplink Map) and are transmitted by a base station (BS) in downlink (DL) periodically, in each radio frame.

6. The article of claim 5, wherein a full map message is still transmitted in predefined intervals for synchronization and to allow new subscriber stations to join said network.

7. The article of claim 4, wherein a receiver of said management messages knows a previously sent management message and merges it with changes conveyed in a delta message to obtain a current full map of said management message.

* * * * *